United States Patent [19]

Müller et al.

[11] Patent Number: 4,527,773
[45] Date of Patent: Jul. 9, 1985

[54] SHUT-OFF VALVE WITH A SEAL FORMED FROM AN ELASTIC STRIP

[75] Inventors: Rudolf Müller, Merzenich; Hermann J. Stolberg, Düren, both of Fed. Rep. of Germany

[73] Assignee: Hermann Rappold & Co. GbmH, Düren, Fed. Rep. of Germany

[21] Appl. No.: 468,995

[22] Filed: Feb. 23, 1983

[30] Foreign Application Priority Data

Mar. 12, 1982 [DE] Fed. Rep. of Germany ....... 3208906

[51] Int. Cl.³ ............................................. F16K 1/226
[52] U.S. Cl. .................................... 251/306; 251/327; 251/328; 251/362; 251/365
[58] Field of Search ............... 251/306, 327, 328, 362, 251/364, 365; 277/DIG. 4, DIG. 7; 52/475, 656; 403/401; 126/285 R

[56] References Cited

U.S. PATENT DOCUMENTS

| 2,606,046 | 8/1952 | Bonner et al. | 277/DIG. 7 |
| 2,996,063 | 8/1961 | Lowe | |
| 3,069,179 | 12/1962 | Johnson | 277/DIG. 4 |
| 3,504,883 | 4/1970 | Beck | 251/327 |
| 4,037,819 | 7/1977 | Kindersley | 251/306 |
| 4,058,290 | 11/1977 | Nelimarkka | 251/306 |
| 4,162,782 | 7/1979 | Wilkins | 251/306 |
| 4,256,143 | 3/1981 | Magill et al. | 251/306 |
| 4,334,550 | 6/1982 | Connor et al. | 251/328 |

FOREIGN PATENT DOCUMENTS

| 1096134 | 12/1960 | Fed. Rep. of Germany . |
| 6608115 | 6/1967 | Fed. Rep. of Germany . |
| 1425697 | 2/1969 | Fed. Rep. of Germany ...... 251/306 |
| 1600989 | 9/1972 | Fed. Rep. of Germany . |
| 2502240 | 7/1976 | Fed. Rep. of Germany . |
| 2615817 | 10/1976 | Fed. Rep. of Germany . |
| 2716744 | 10/1978 | Fed. Rep. of Germany . |
| 843845 | 8/1960 | United Kingdom . |
| 873150 | 7/1961 | United Kingdom . |
| 908244 | 10/1962 | United Kingdom . |
| 1317137 | 5/1973 | United Kingdom . |
| 2034442 | 6/1980 | United Kingdom . |
| 2091845 | 8/1982 | United Kingdom . |

Primary Examiner—Martin P. Schwadron
Assistant Examiner—James R. Shay
Attorney, Agent, or Firm—Wenderoth, Lind & Ponack

[57] ABSTRACT

A shut-off valve, particularly for use in a pipeline for conveying gases, includes a valve casing, a valve member mounted for movement between a valve open position and a valve closed position, and a casing seal mounted on at least one of the valve casing and the valve member for forming a seal with a sealing surface at least when the valve member is in the valve closed position. The casing seal includes a frame member having two legs extending in a direction toward the position of the sealing surface when the seal is formed. The two legs are spaced and define therebetween an open channel. The casing seal further includes a seal member formed from a substantially flat elastic strip which is deformed to include two leg portions which are positioned between and freely and elastically urged toward respective inner surfaces of the legs of the frame member and a bent portion which connects the two leg portions and which projects outwardly of the channel for sealing contact with the sealing surface.

5 Claims, 18 Drawing Figures

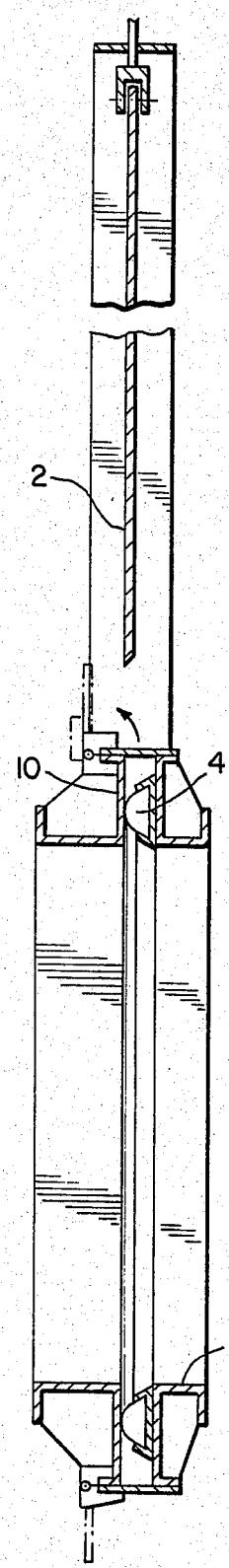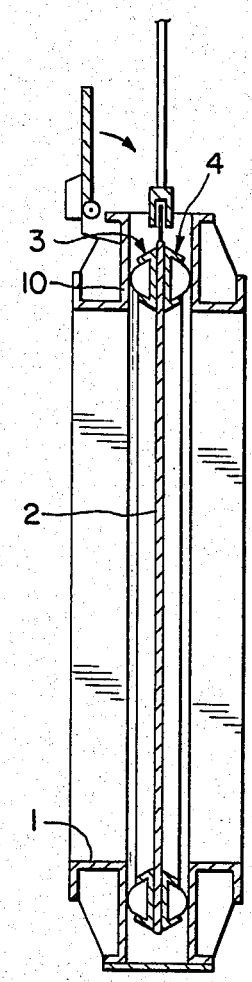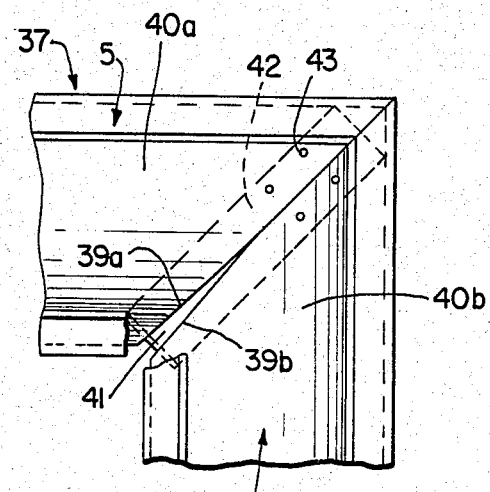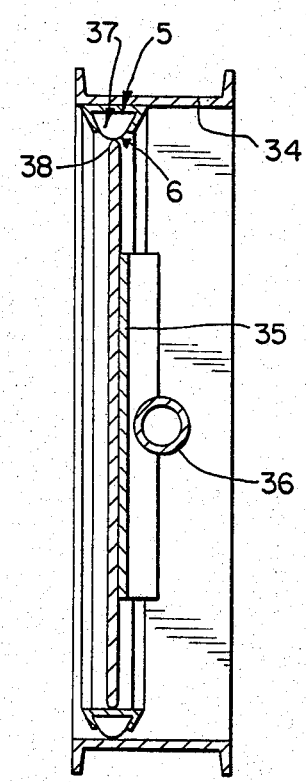
FIG. 9     FIG. 10     FIG. 11
FIG. 12

SHUT-OFF VALVE WITH A SEAL FORMED FROM AN ELASTIC STRIP

BACKGROUND OF THE INVENTION

The present invention is directed to a shut-off valve, such as a gate valve or a damper or throttle valve, particularly for use in a pipeline for conveying gases. More particularly, the present invention is directed to such a valve having a seal in the form of an elastic strip which is inserted into a frame member having two legs extending in a direction toward the position of a sealing surface. In accordance with the present invention, the frame member may be mounted on a valve casing and/or a movable valve member.

It is known that various seals are employed for shut-off valves such as gate valves and dampers or throttle valves, particularly in situations where hot and dust-containing gases are involved. In known valves of this type, the seal has been in the form of either a closed pipe-shaped or tubular-shaped profile, as disclosed in West German DE-GM No. 66 08 115, or an open semi-tubular shaped profile, such as disclosed in West German DE-PS No. 10 96 134, DE-OS No. 26 15 817, DE-OS No. 27 16 744, prior to installation of the seal in the valve. These known seals are expensive to produce and to install and frequently have the added disadvantage of not possessing the elastic properties necessary for achieving a satisfactory seal.

SUMMARY OF THE INVENTION

With the above discussion in mind, it is the object of the present invention to provide a shut-off valve having a seal which can be easily produced and installed, and which is easily elastically deformed on cite for assembly with valves of varying configuration and construction.

This object is achieved in accordance with the present invention by the provision of a shut-off valve including a valve casing, a valve member mounted for movement between a valve open position and valve closed position, and seal means, mounted on at least one of the valve casing and valve member, for forming a seal with a sealing surface at least when the valve member is in the valve closed position. In accordance with the present invention, the seal means includes a frame member having two legs extending in a direction toward the position of the sealing surface when the seal is formed, the two legs being spaced and defining therebetween an open channel, and a seal member formed from a substantially flat elastic sealing strip which is deformed to include two leg portions which are positioned between and freely and elastically urged toward respective inner surfaces of the legs of the frame member and a bent portion which connects the two leg portions and which projects outwardly of the channel for sealing contact with the sealing surface. Thus, the seal member according to the present invention essentially starts as a flat sealing strip which, after installation in the frame member, fits in an unattached manner against the legs of the frame member and forms a bent portion which projects from the frame member. To produce this seal member, it is necessary only to provide a correspondingly wide strip of a suitable, elastic sheet metal or similar material. This flat sealing strip is inserted into the frame member by bending it manually or by means of a simple tool. Because of its elasticity, the sealing strip fits against the legs of the frame member and assumes the shape of an elastic or springy bend in the seal area. The legs of the frame member extend approximately tangential to the bend portion of the seal member. If the seal is pushed by a counter sealing surface of the valve, then the sealing strip in the area of the bent portion will yield accordingly and thus produce the required sealing pressure against the counter sealing surface. The seal member according to the present invention has the advantage of providing a perfect sealing capacity because the sealing strip always can fit tightly over a relatively large area against the counter sealing surface with which it acts, even if the sealing surface is uneven. An additional advantage of the present invention is the fact that the sealing strip is held against the legs of the frame member with contact pressure only, whereby it is not necessary to provide any fastening devices to hold the sealing strip in the frame member. This makes it possible to use relatively long sealing strips, even with valves which are under thermal stresses during use, since the sealing strips can expand freely in the frame member. Furthermore, this makes it possible to produce the frame member and sealing strips from materials having different coefficients of thermal expansion.

In accordance with the present invention, the frame member may be substantially U-shaped, with the legs of the frame member converging in the direction toward the sealing surface, and the seal member may be substantially U-shaped. Alternatively, the seal member may be substantially tubular or pipe-shaped. Additionally, the frame member may have a partial circular configuration, and the seal member may be substantially tubular or pipe-shaped.

The seal member may have therein elongated openings, and guide pins may be fixed to the frame member, adjacent one or both of the legs thereof or adjacent a web portion of the frame member, to extend through the elongated openings. By this arrangement, the seal member is retained in the frame member by the guide pins and is movable toward and away from the sealing surface by the extent of the elongated openings. This arrangement particularly is useful in embodiments of the present invention wherein the seal member has a circular or tubular configuration.

In accordance with a further feature of the present invention, the seal means may further include an elastically deformed supporting strip, formed of a material similar to that of the sealing strip, and positioned inwardly of the seal member and urging the leg portions of the seal member toward the respective legs of the frame member. This feature of the present invention increases the sealing capacity and limits the deformation of the seal member.

In accordance with a further feature of the present invention, there may be provided dust strips positioned between outer sides of the leg portions of the seal member and inner surfaces of the legs of the frame member, such dust strips having portions extending outwardly of the channel for preventing dust from entering therein. This feature of the present invention is particularly advantageous where gases having a high dust content are involved. Furthermore, the dust strips may be fixed to the leg portions.

The frame member may include a web portion joining the two legs and welded or bolted to the valve casing or to the valve member. Alternatively, the frame member may comprise two separate elements each defining one of the legs and together defining the channel.

Such two separate elements may be welded or bolted to the valve casing or the valve member.

Three inner ends of the leg portions of the seal member may be rounded or beveled, thereby possibly providing better support of the seal member against the frame member.

The seal means includes plural straight sections joined and abutting at adjacent ends, and the seal member at each such plural section includes plural segments spaced longitudinally from each other by expansion joints. Each such expansion joint is covered by an elastic cover strip. Each section includes end segments abutting similar end segments of adjacent sections. Adjacent edges of the end segments of adjacent section are mitered to define a diagonal joint. Each diagonal joint is covered by an elastic cover strip. By this arrangement, corners of a seal means are mitered to define impacting or abutting edges, and such edges are covered by elastic cover strips which are positioned inwardly of the respective segments.

If the seal means is installed in a gate valve, the adjacent corner edges of the end segments defining each diagonal joint are mitered to make mutual contact along the entire length of the miter line of the joint, and the respective elastic cover strip is fixedly connected to both end segments adjacent diagonal center portions of the abutting adjacent edges.

If the seal means is installed on the casing of a damper or throttle valve, adjacent corner edges of the segments are mitered in a manner to diverge from an outer end of the diagonal joint to an inner end thereof, and the elastic cover strip is fixedly connected to both end segments adjacent diagonal outer portions of the abutting adjacent edges. If the seal means is attached to a valve disc of a damper or throttle valve, adjacent corner edges of the end segments defining each diagonal joint are mitered in such a manner that the adjacent edges diverge from an inner end of the diagonal joint to the outer end, and the elastic cover strip is fixedly connected to both end segments adjacent diagonal inner portions of the abutting adjacent edges, if necessary by means of a separate clip member.

In all embodiments of the present invention, the frame member may be welded to the respective valve element or may be bolted thereto, to thereby enable ready removal and assembly of the seal.

BRIEF DESCRIPTION OF THE DRAWINGS

The above and other objects, features and advantages of the present invention will be described in more detail below with reference to the accompanying drawings, wherein:

FIG. 9 is a view similar to FIG. 1, but of a further embodiment of the present invention;

FIG. 10 is a view similar to FIG. 2, but of a further embodiment of the present invention;

FIG. 11 is a longitudinal cross-sectional view of an embodiment of the present invention adapted to a throttle valve or damper, the upper half of FIG. 11 illustrating a seal according to the present invention mounted on a casing of the valve, and the lower half of FIG. 11 illustrating the seal being mounted on a valve member;

FIG. 12 is an enlarged partial end view of a corner of the valve seal structure of the upper portion of FIG. 11;

DETAILED DESCRIPTION OF THE INVENTION

Figures 1, 2:
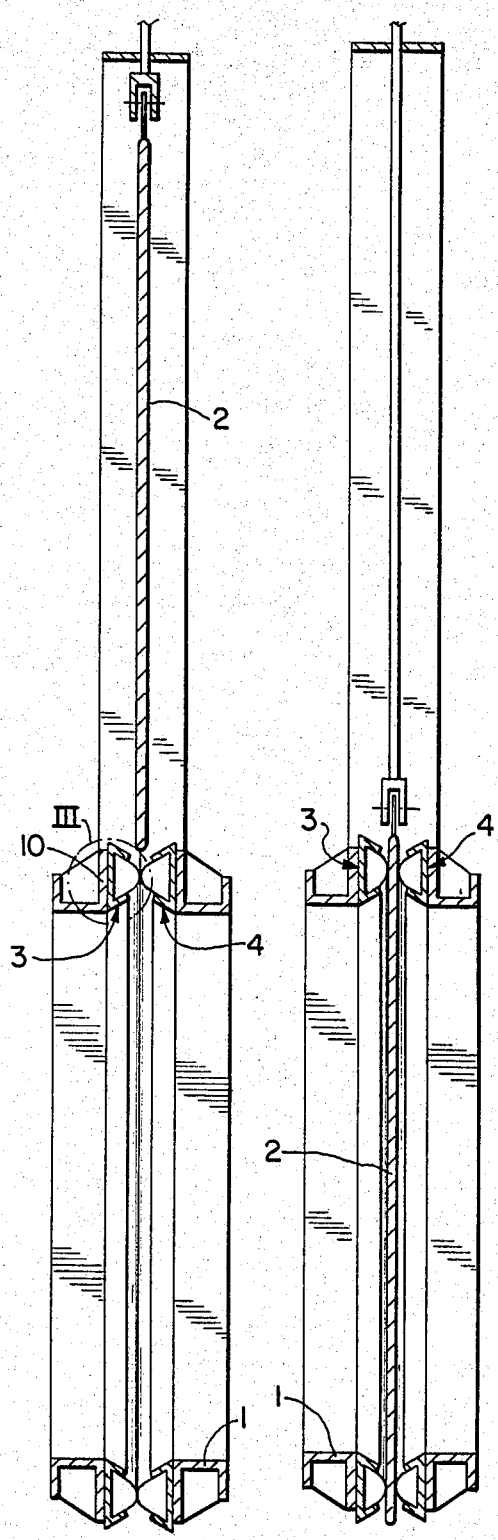
FIG. 1 is a longitudinal cross-sectional view of a gate valve shown in an open position and in accordance with a first embodiment of the present invention.
FIG. 2 is a view of the valve of FIG. 1, but shown in the closed position thereof.
Figure 3:
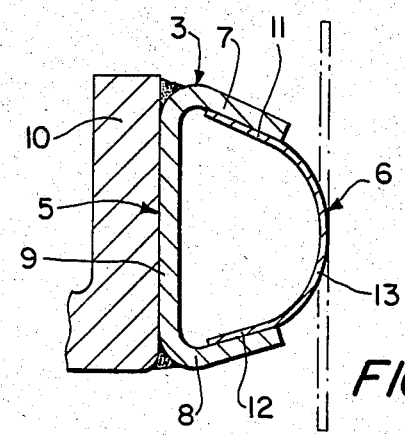
FIG. 3 is an enlarged cross section of the area marked III in FIG. 1.

A first embodiment of the present invention is illustrated in FIGS. 1 and 2 which respectively show opened and closed positions of a sliding gate valve including a casing 1 and a sliding valve or disc 2 which is movable into and from the casing 1 between two confronting rectangular casing seals 3 and 4 which are identical and one of which is shown in detail in FIG. 3.

Thus, casing seal 3 includes a frame member 5 fixed by welding to a casing wall 10 of slide casing 1. Frame member 5 has two legs 7, 8 which are spaced from each other to define therebetween an open channel, and in this embodiment of the invention legs 7, 8 converge in a direction toward a sealing surface, i.e. toward valve member 2 in the closed position shown in FIG. 2, and toward the casing seal 4 in the open position shown in FIG. 1. Legs 7, 8 are joined by a web 9, such that the frame member 5 has a generally U-shaped cross-sectional configuration.

Within the frame member 5 is positioned a seal member 6 in the form of a sealing strip made of an elastic material, for example an elastic sheet metal material which is flat prior to installation, as shown by the dashed lines in FIG. 3. Preferably, this sheet metal strip may be 0.2 to 0.5 mm thick and consists of a steel which is elastic because of its own hardness, on the basis of carbon content, or because it has been cold rolled. The width of the sealing strip is measured such that after installation its longitudinal edges or leg portions 11, 12 contact a substantial portion of legs 7, 8 of frame member 5. To install the seal member 6 within the frame member 5, the flat sealing strip is slightly bent either manually or with a simple tool and is inserted into the open channel of frame member 5. The leg portions 11, 12 fit flush against respective legs 7, 8 of frame member 5 because of the elasticity of the seal member. Thus, the seal member assumes the shape of an elastic bend or bent portion in the area of sealing contact, whereby legs 7, 8 of frame member 5 extend approximately tangential to bent portion 13.

Seal member 6 is held securely in frame member 5 by the contact pressure of leg portions 11, 12 against legs 7, 8. On the other hand, because seal member 6 fits freely adjacent legs 7, 8, the seal member is elastically deformable if it is stressed by a counter sealing surface acting on bent portion 13. Seal member 6 therefore always exerts sufficient sealing pressure on such counter sealing surfaces, and at the same time, fits flush against such surfaces despite possible unevenness thereof or the presence of foreign substances therebetween. Depending on the elastic properties of the sealing strip used to form the seal member 6, the seal member may have more or less deformability and thus a more or less wide area of contact with the counter sealing surfaces. In this embodiment of the present invention, as indicated above and as will be apparent from FIGS. 1 and 2 of the drawings, the counter sealing surfaces are a surface of the valve member 2 in the closed position and the seal member of the opposite casing seal 4 in the open position. Variation of the elastic properties of the seal members provides variation of the sealing pressure against the counter sealing surfaces.

Figure 4:
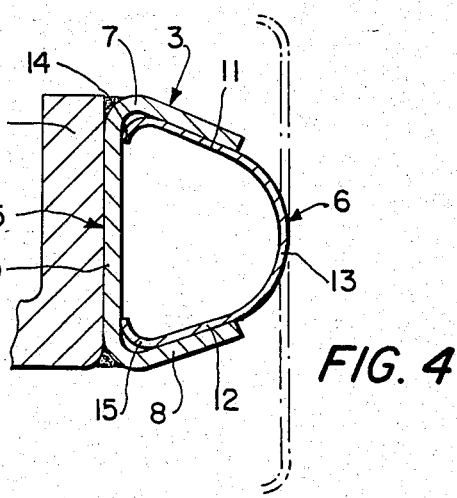
FIG. 4 is a view similar to FIG. 3 but of a further embodiment of the present invention.

FIG. 4 illustrates a modification of the configuration of the seal member 6, wherein free or inner ends or edges 14, 15 of leg portions 11, 12 are rounded or beveled. This arrangement provides contact surfaces on both longitudinal edges against web 9 of frame member 5, thereby guaranteeing a more secure support for seal member 6 without limiting its elastic deformability.

Figure 5:
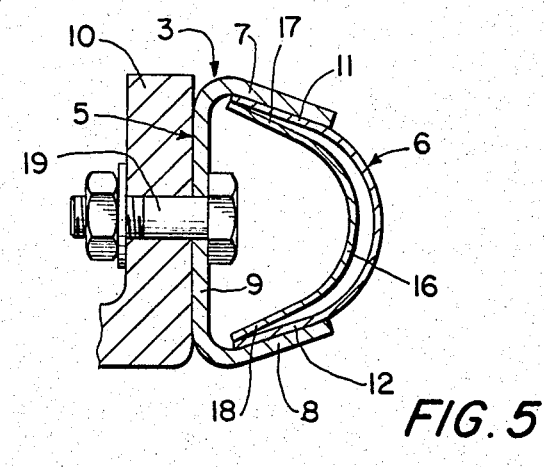
FIG. 5 is a view similar to FIG. 3, but also of a further embodiment of the present invention.

FIG. 5 illustrates two additional modifications of the configuration of casing seal 3. Firstly, web 9 of frame member 5, rather than being welded to casing wall 10, is bolted thereto by means of bolts 19 which may be distributed in the longitudinal direction. This arrangement makes it possible to remove the casing seal 3 from the slide casing 1 in order to facilitate installation and maintenance. Additionally, casing seal 3 includes a supporting strip 16 formed of an elastic material, which may be similar to the material of seal member 5, and which is flat prior to installation. Supporting strip 16 is inserted before or together with seal member 6 into frame member 5 by bending it manually or with an auxiliary tool. Supporting strip 16 serves to increase the contact pressure of seal member 6 against frame member 5 by additionally pressing leg portions 11, 12 of seal member 6 against legs 7, 8 of frame member 5, by means of longitudinal edges 17, 18 of supporting strip 16.

Figure 6:
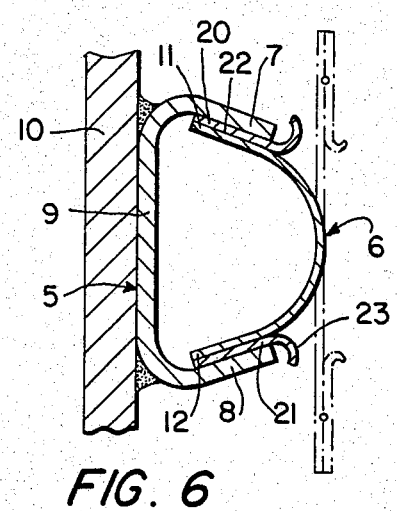
FIG. 6 is a view similar to FIG. 3, but also of a still further embodiment of the present invention.

FIG. 6 illustrates a design variation which particularly is useful in installations such as in a pipeline for conveying gases which are heavily dust laden. Thus, seal member 6 has connected thereto, for example by means of spot welds 22, elastic dust rejecting strips 20, 21 extending along the outer surfaces of respective leg portions 11, 12. Strips 20, 21 have, exterior of the channel of the frame member 5, bent portions 23 extending along the longitudinal edges which face the respective sealing surfaces and which cover the outer edges of legs 7, 8. After installation, strips 20, 21 fit flush against the inside surfaces of legs 7, 8 and prevent dust or other dirt from entering between seal member 6 and legs 7, 8.

Figure 7:
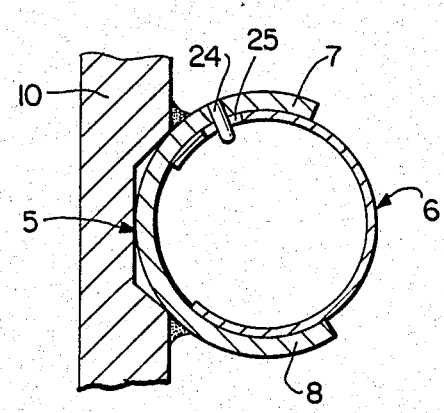
FIG. 7 is a view similar to FIG. 3, but of a yet further embodiment of the present invention.

FIG. 7 illustrates an embodiment of the present invention wherein the frame member 5 has a semi or part tubular or circular cross-sectional configuration, and wherein seal member 6 similarly has a partially substantially tubular or circular cross-sectional configuration. Additionally, frame member 5 has fixed thereto a plurality of inwardly projecting guide pins 24 which extend through elongated openings 25 formed in seal member 6. Guide pins 24 serve to prevent seal member 6 from slipping out of frame member 5, without hampering the free fit of the seal member 6 against the supporting surface of the frame member 5. Thus, seal member 6 is retained in frame member 5 by guide pins 24 and is movable in directions toward and away from the frame member by the extent of the elongated openings 25. In place of guide pins 24, hooks or similar devices may be employed.

Figure 8:
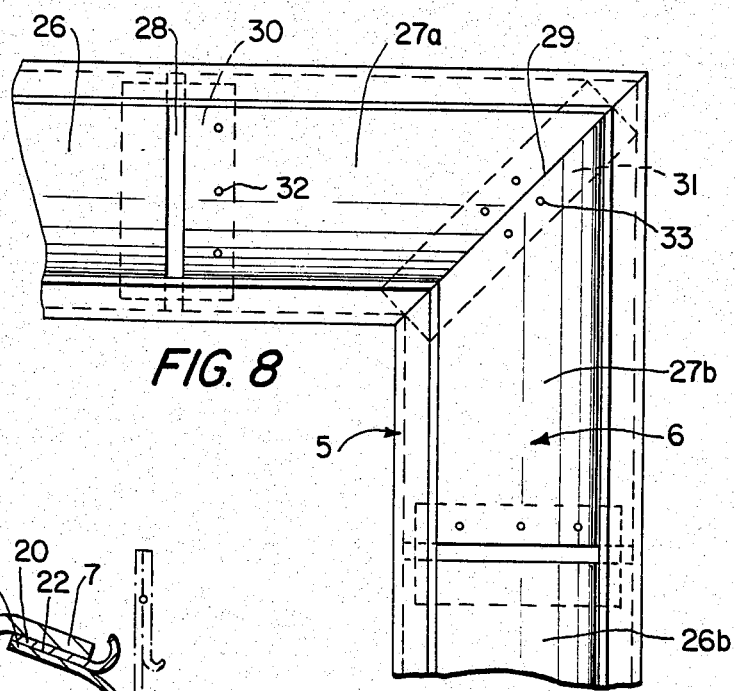
FIG. 8 is an enlarged end view of one corner area of the gate valve seal of the embodiment of FIGS. 1 and 2.

FIG. 8 illustrates the longitudinal and corner configuration of the seal members 6 with regard to various of the embodiments, particularly for use in a sliding gate valve structure such as shown in FIGS. 1 and 2. Thus, the casing seal is of rectangular configuration including four straight sections, portions of two adjacent of which sections are illustrated in FIG. 8. In each section, the seal member 6 includes plural longitudinally divided segments 26a and 26b, as well as respective end segments 27a and 27b. From the view of FIG. 8, segments 26a and 26b are rectangular, and end segments 27a and 27b are joined at mitered edges to form a diagonal impact joint 29. Expansion joints 28 are formed between adjacent segments 26a and end segments 27a. Similar expansion joints are formed between adjacent segments 26b and between segments 26b and adjacent end segments 27b. Expansion joints 28 are covered inwardly by elastic cover strips 30 which are connected, for example by spot welds 32 to an adjacent end of one of the segments forming each expansion joint 28. In FIG. 8, cover strips 30 are spot welded to the end segments. The diagonal joint 29 is inwardly covered by an elastic cover strip 31 which is welded to both end segments 27a, 27b at diagonal center portions of the abutting adjacent edges thereof. The mitered edges of end segments 27a, 27b are in abutment over the entire diagonal length of joint 29. By the above arrangement, when the casing seal is subjected to thermal stress, expansion joints 28 enable longitudinal expansion of the seal members along each side of the rectangular casing seal, and the configuration of diagonal joint 29 and the attachment of cover strip 31 enables end segments 27a, 27b to bend freely at the corners.

FIG. 9 illustrates a modified embodiment of a sliding gate valve according to the present invention. In this embodiment, only a single casing seal 4 is provided, and in the open position illustrated in FIG. 9, the seal member 6 of casing seal 4 contacts with casing wall 10. In this embodiment, the seal member of the casing seal 4 has to deform twice as much during the closing sliding movement of slide member 2 than do the seal members of the casing seals 3 and 4 in the embodiment of FIGS. 1 and 2.

In the embodiment of FIG. 10, the sliding disc or valve member 2 has attached thereto rectangular casing seals 3 and 4, the seal members of which are pushed against opposite casing walls 10 in the closed position of the slide.

FIG. 11 illustrates an embodiment of the present invention in the form of a damper or throttle valve or butterfly valve, and this embodiment includes a valve casing 34 and a rectangular valve disc or valve member 35 pivotally mounted about rotating shaft 36 within casing 34. The upper half of FIG. 11 illustrates a rectangular casing seal 37 mounted on casing 34, and the lower half of FIG. 11 illustrates the casing seal mounted on the valve member 35. The casing seal 37 in the embodiment of FIG. 11 substantially is similar to the casing seal 3 described above and includes a frame member 5 and seal member 6. In the upper portion of FIG. 11, the seal member 6 is compacted and seals against a counter sealing surface 38 of valve member 35 during closing of the valve and thus forms a very tight seal even for hot and dust laden gases. Similarly, with regard to the lower half of FIG. 11, the seal member of the casing seal contacts against and is compacted by a counter sealing surface formed by the inner surface of the casing 34.

FIG. 12 is a view similar to FIG. 8 illustrating a corner area of the casing seal when the casing seal 37 is mounted on the casing 34. In this embodiment, end segments 40a, 40b have adjacent edges 39a, 39b which are mitered to define a diagonal joint 41, with the edges 39a, 39b diverging from an outer end of the diagonal joint to an inner end thereof. This makes it possible for the end segments 40a, 40b to be deformed at the corners. The joint 41 is inwardly covered by an elastic cover strip 42 which is fixedly connected to both end segments 40a, 40b, for example by spot welds 43 to both end segments adjacent diagonal outer portions of the abutting adjacent edges thereof.

Figure 13:
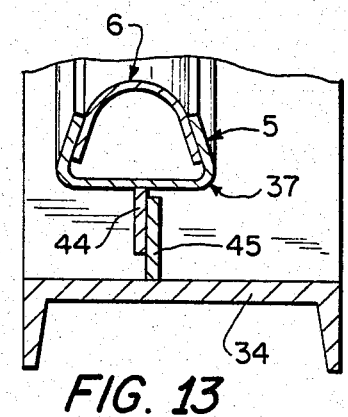
FIG. 13 is an enlarged longitudinal section of a modification of the structure illustrated in the upper portion of FIG. 11.

FIG. 13 illustrates a modification of the arrangement of the upper portion of FIG. 11. In the embodiment of FIG. 13, the casing seal 37 includes a fastening web 44 fixed to frame member 5 and connected by means of bolts to a mounting flange 45 on valve casing 34. This arrangement makes is possible easily to remove casing seal 37 from the valve, and to remove the seal member 6 at a position outside of the valve structure.

Figure 14:
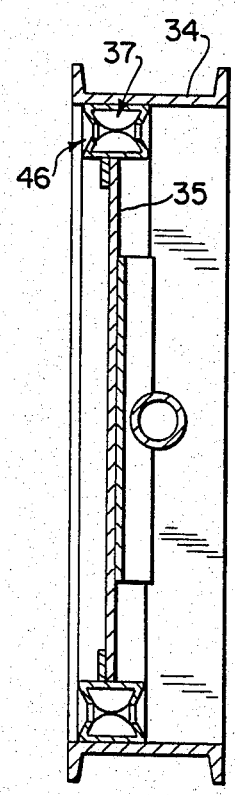
FIG. 14 is a longitudinal cross-sectional view of a modification of the arrangement of FIG. 11.

FIG. 14 illustrates an embodiment which is similar to the embodiment of FIG. 11, except that two casing seals are provided, i.e. casing seal 37 on the casing 34 and rectangular casing seal 46 on valve member 35. Seal 46 is fastened, for example by bolts, to the valve member 35 by an arrangement similar to that illustrated in FIG. 13.

Figure 15:
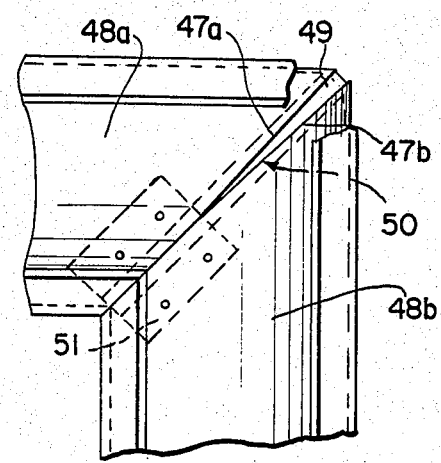
FIG. 15 is an enlarged partial end view of a corner of the seal structure mounted on the valve member shown in FIG. 14.

FIG. 15 is a view similar to FIG. 12, but of the corner structure of the casing seal 46 shown in FIG. 14. End segments 48a, 48b are mitered to define a diagonal joint 49, with edges 47a, 47b of the end segments being mitered to diverge from an inner end of the diagonal joint to an outer end of the diagonal joint. The joint 49 is inwardly covered by a narrow elastic cover strip 50, in this embodiment with the aid of an enlarged cover strip or clip 51 which is connected, for example by spot welds, to both end segments 48a, 48b adjacent diagonal inner portions of the abutting adjacent edges thereof. This arrangement makes it possible for the end segments to be deformed at the corners.

Figure 16:
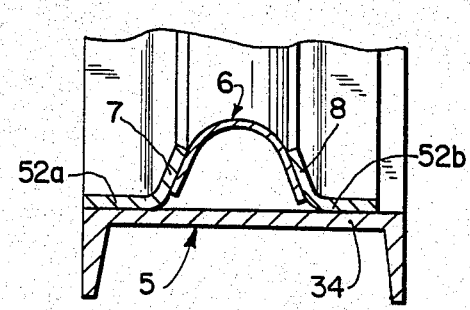
FIGS. 16 and 17 are enlarged partial longitudinal cross-sectional views of further embodiments of the frame member.
Figure 17:
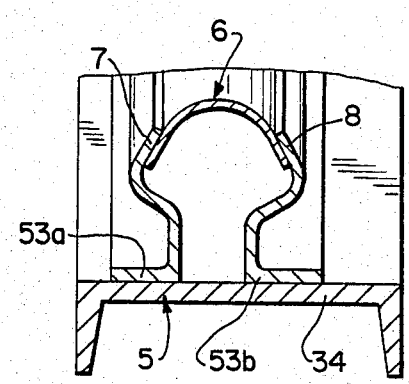

FIGS. 16 and 17 illustrate modifications of the casing seals 37 and 46, although the features illustrated in FIGS. 16 and 17 also may be applied to the casing seals 3 and 4 employed in the gate valve structures of FIGS. 1, 2, 9 and 10. Thus, in FIG. 16 the frame member 5 is not formed of a single member, but rather is formed by two separate elements 52a, 52b which are fastened, for example by bolts, to casing 34. Separate elements 52a, 52b extend parallel to each other and define legs 7, 8. The embodiment of FIG. 17 is similar to that of FIG. 16, with the exception that the two separate elements 53a, 53b have a more rod-like transverse cross-sectional configuration.

Figure 18:
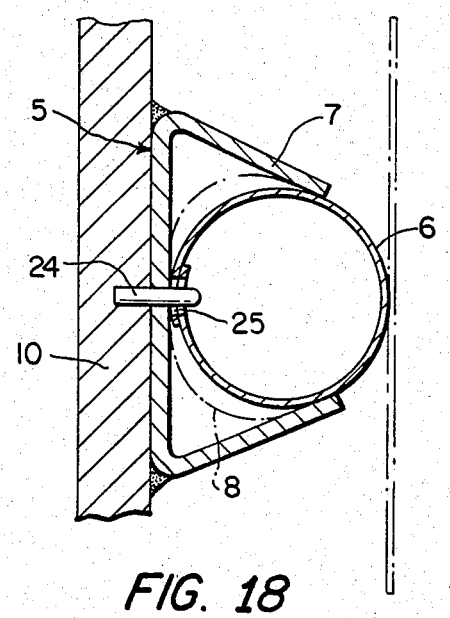
FIG. 18 is a view similar to FIG. 3 but illustrating a further embodiment of the present invention.

FIG. 18 illustrates a further modification of the casing seal structure adapted to be employable in the gate valve of FIGS. 1 and 2 and includes various of the features shown in FIGS. 3 and 7. It is to be understood however that the embodiment of FIG. 18 may be employed in the throttle valve structure of FIG. 11. Thus, in FIG. 18 the seal member 6 is generally tubular or circular shaped and has overlapping free ends with elongated openings 25 therein. Guide pins 24 are fixed to the web of frame member 5 and extend through elongated openings 25. Guide pins 24 thus serve a purpose similar to that achieved in the embodiment of FIG. 7.

Although the present invention has been described and illustrated in detail with respect to preferred embodiments, it is to be understood that various modifications and changes may be made to the specifically described and illustrated features without departing from the scope of the present invention. Furthermore, it is to be understood that various of the above described features may be combined in the various above described embodiments. Furthermore, it is to be understood that it easily would be possible to produce the sealing strip and seal member 6 from other elastic materials such as a synthetic material, rubber or any other suitable material as will be apparent to one skilled in the art. Furthermore, it is possible to provide guide pins 24 fitting into respective openings at both ends of the seal member 6 in the embodiment of FIG. 7. The seal structure of the present invention may be employed in valve configurations other than rectangular, for example valve configurations having six, eight or other numbers of corners, as well as in shutter valves.

We claim:

1. A polygonal shut-off valve, particularly for use in a pipeline for conveying cases, and comprising:
    a valve casing;
    a valve member mounted for movement between a valve open position and a valve closed position;
    seal means, mounted on at least one of said valve casing and said valve member, for forming a seal with a sealing surface at least when said valve member is in said valve closed position;
    said seal means including a polygonal frame member formed by plural straight sections each having two legs extending in a direction toward the position of said sealing surface when said seal is formed, said two legs being spaced and defining therebetween an open channel;
    said seal means further including a polygonal seal member formed by plural straight sections each formed from a respective substantially flat elastic strip which is deformed to include two leg portions which are positioned between and freely and elastically urged toward respective inner surfaces of said legs of said frame member and a bent portion which connects said two leg portions and which projects outwardly of said channel for sealing contact with said sealing surface, said seal member having therein elongated openings; and
    guide pins fixed to said frame member and extending through said elongated openings, such that said seal member is retained in said frame member by said guide pins and is movable in said direction with respect to said frame member by the extent of said elongated openings.

2. A valve as claimed in claim 1, wherein said frame member is substantially U-shaped, said legs converge in said direction, and said seal member is substantially tubular shaped.

3. A valve as claimed in claim 1, wherein said frame member has a partial circular configuration, and said seal member is substantially tubular shaped.

4. A polygonal shut-off valve, particularly for use in a pipeline for conveying gases, and comprising:
- a damper or throttle valve casing;
- a valve member mounted for movement between a valve open position and a valve closed position;
- seal means, mounted on said valve casing, for forming a seal with a sealing surface at least when said valve member is in said valve closed position, said seal means including plural straight sections;
- said seal means including a polygonal frame member formed by plural straight sections each having two legs extending in a direction toward the position of said sealing surface when said seal is formed, said two legs being spaced and defining therebetween an open channel;
- said seal means further including a polygonal seal member formed by plural straight sections each formed from a substantially flat elastic strip which is deformed to include two leg portions which are positioned between and freely and elastically urged toward respective inner surfaces of said legs of said frame member and a bent portion which connects said two leg portions and which projects outwardly of said channel for sealing contact with said sealing surface;
- said seal member at each said section thereof including plural segments spaced longitudinally by expansion joints, each said expansion joint being covered by an elastic cover strip;
- each said section of said seal member including end segments abutting similar end segments of adjacent said sections, adjacent edges of said end segments of adjacent said sections being mitered to define a diagonal joint such that said adjacent edges diverge from an outer end of said diagonal joint to an inner end thereof; and
- each said diagonal joint being covered by a respective elastic cover strip fixedly connected to both the respective said end segments adjacent diagonal outer portions of the abutting adjacent edges thereof.

5. A polygonal shut-off valve, particularly for use in a pipeline for conveying gases, and comprising:
- a valve casing;
- a valve disc pivotally mounted for movement between a valve open position and a valve closed position;
- seal means, mounted on said valve disc, for forming a seal with a sealing surface at least when said valve disc is in said valve closed position, said seal means including plural straight sections;
- said seal means including a polygonal frame member formed by plural straight sections each having two legs extending in a direction toward the position of said sealing surface when said seal is formed, said two legs being spaced and defining therebetween an open channel;
- said seal means further including a polygonal seal member formed by plural straight sections each formed from a substantially flat elastic strip which is deformed to include two leg portions which are positioned between and freely and elastically urged toward respective inner surfaces of said legs of said frame member and a bent portion which connects said two leg portions and which projects outwardly of said channel for sealing contact with said sealing surface;
- said seal member at each said section thereof including plural segments spaced longitudinally by expansion joints, each said expansion joint being covered by an elastic cover strip;
- each said section of said seal member including end segments abutting similar end segments of adjacent said sections, adjacent edges of said end segments of adjacent said sections being mitered to define a diagonal joint such that said adjacent edges diverge from an inner end of said diagonal joint to an outer end thereof; and
- each said diagonal joint being covered by a respective elastic cover strip fixedly connected to both the respective said end segments adjacent diagonal inner portions of the abutting adjacent edges thereof.

* * * * *